Figure 1:
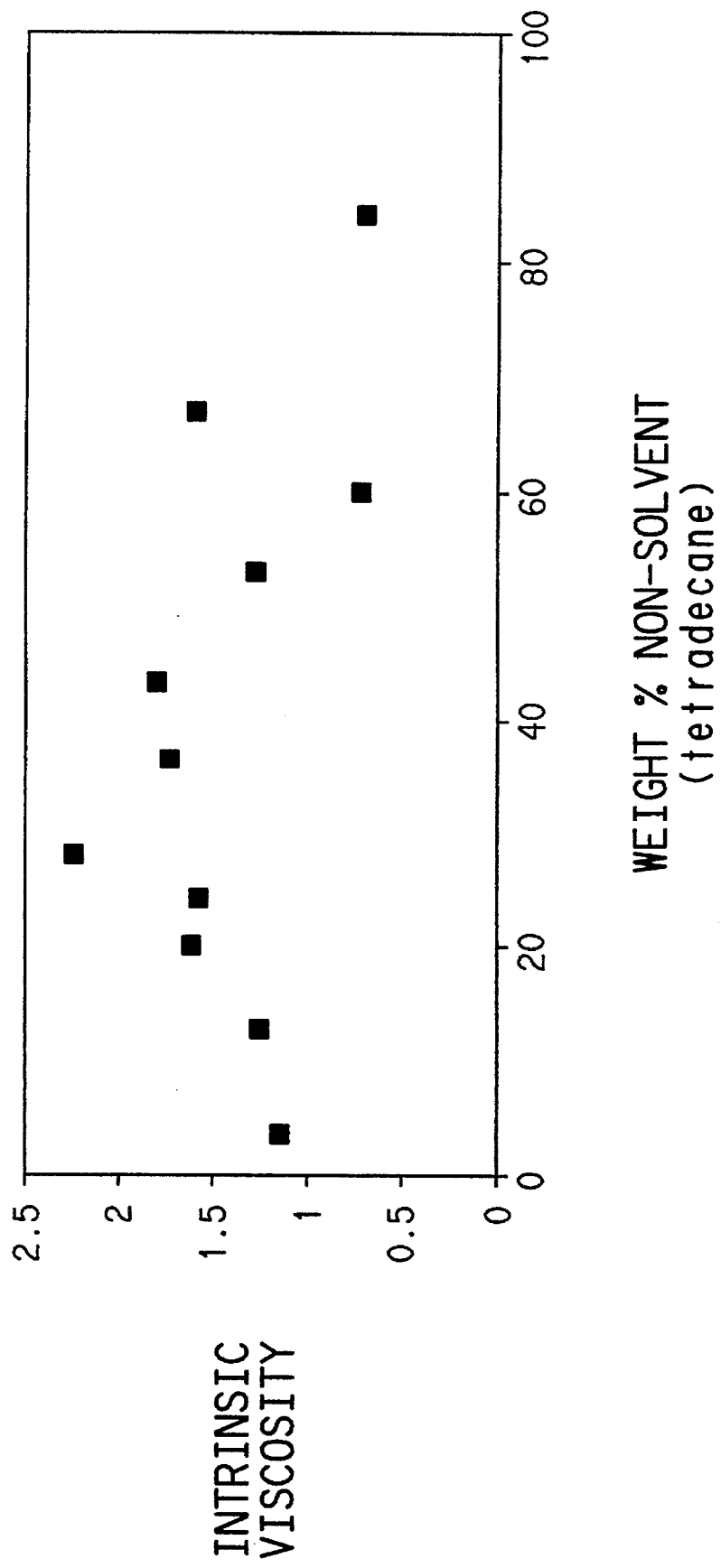

United States Patent [19]

Jones et al.

[11] Patent Number: 5,602,199
[45] Date of Patent: Feb. 11, 1997

[54] PROCESS FOR PRODUCING POLYESTERS

[75] Inventors: Edward B. Jones, Hendersonville, Tenn.; Robert R. Burch, Exton, Pa.

[73] Assignee: E. I. du Pont de Nemours and Company, Wilmington, Del.

[21] Appl. No.: 497,138

[22] Filed: Jun. 30, 1995

Related U.S. Application Data

[63] Continuation of Ser. No. 212,667, Mar. 11, 1994, abandoned.

[51] Int. Cl.$^6$ .................................. C08K 5/06; C08J 3/00
[52] U.S. Cl. ...................... 524/755; 528/274; 528/295; 528/298; 528/302; 528/308; 528/308.6; 528/494; 528/497; 525/437; 525/444; 524/770
[58] Field of Search ................... 528/274, 295, 528/298, 302, 308, 308.6, 494, 497; 525/437, 444; 524/755, 770

[56] References Cited

U.S. PATENT DOCUMENTS

| | | | |
|---|---|---|---|
| 3,329,653 | 7/1967 | Beavers et al. | 528/176 |
| 4,613,664 | 9/1986 | Tate et al. | 528/174 |

FOREIGN PATENT DOCUMENTS

| | | |
|---|---|---|
| 1457711 | 9/1966 | France. |
| 340343 | 9/1959 | Switzerland. |
| 755975 | 12/1952 | United Kingdom. |

*Primary Examiner*—Samuel A. Acquah

[57] ABSTRACT

Disclosed herein is a process for the manufacture of polyesters which involves heating polymerizable monomers, oligomers or low molecular weight polymers in a mixture of a solvent and non-solvent. The polymerization by-product is codistilled from the boiling solvent/non-solvent mixture.

8 Claims, 1 Drawing Sheet

PROCESS FOR PRODUCING POLYESTERS

This is a continuation of application Ser. No. 08/212,667 filed Mar. 11, 1994, now abandoned.

FIELD OF THE INVENTION

Disclosed herein is a process for the manufacture of polyesters which involves heating polymerizable monomers, oligomers or low molecular weight polyesters in a mixture of a solvent and a non-solvent and is particularly useful for producing high molecular weight polyesters.

BACKGROUND OF THE INVENTION

Polyesters are used in numerous commercial applications such as fibers, films, molded plastics and coatings. The preparation of such products by conventional melt polymerization methods is limited by the high viscosity of the melt.

U.S. Pat. No. 4,613,664 describes a method to prepare high molecular weight polyesters having an intrinsic viscosity greater than 0.9 dL/g wherein monomers from dicarboxylic acids, or esters thereof, and ethylene glycol are polycondensed in specific heating media which may swell the polymers produced. Solvents are specifically excluded in the description of the invention. The patent fails to mention the boiling of the heating medium to remove the low boiling by-product of the polycondensation reaction.

U.S. Pat. No. 3,329,653 describes a process for condensation polymers including polyesters, in which the oligomeric condensation product is heated at reflux temperatures in a liquid non-solvent containing a swelling agent for the polymer. These temperatures, however, are below the melting point of the polymers. The polyester products are unique in that their melting points are significantly higher than corresponding conventional polymers.

SUMMARY OF THE INVENTION

This invention involves a process for the production of a polyester which comprises heating and agitating a mixture of one or more polymerizable monomers, oligomers, or lower molecular weight polyesters in a mixture of a solvent and a non-solvent, at a temperature of about 150° C. or higher, while codistilling a polymerization by-product, the solvent and the non-solvent, or the solvent, or the non-solvent, from the mixture;

provided that a polyester product and the solvent form a liquid phase separate from a phase formed predominantly by the non-solvent at said temperature.

DETAILS OF THE INVENTION

This invention involves heating a mixture of one or more polymerizable monomer(s) or oligomer(s) in a mixture of solvent and non-solvent. It is believed that the polymerization takes place by esterification and/or transesterification in a discrete, non-continuous, dispersed phase containing the growing polymer dissolved in the solvent, the non-solvent forming the continuous phase. The droplets of polymer/solvent of the non-continuous phase exhibit a very high surface area which allows for rapid removal of the polymerization by-products. The solvent serves to maintain the viscosity of the polymer solution at a manageable level and thus prevents premature agglomeration of the dispersed droplets. The polymerization by-product(s) is removed from the reaction mass by the boiling action of the solvent and/or non-solvent, preferably as an azeotrope. The distillate, on cooling, usually phase separates allowing ready removal and recycling of the polymerization by-product from the codistilled solvent/non-solvent. The solvent and/or non-solvent can then be purified as necessary and also recycled back to the reactor. The heating to the prescribed temperature promotes the removal of the polymerization by-product and allows for very rapid polymerization rates. The resulting polymer, preferably higher molecular weight polymer, is isolated from the solvent by extraction or the solution is used directly to form shaped articles.

By polymerizable monomer is meant a monomeric compound which polymerizes to a polymer either by itself or with other monomers (which are also present). Examples of such compounds are bis(2-hydroxyethyl) terephthalate, bis (4-hydroxybutyl) terephthalate, bis(2-hydroxyethyl) naphthalenedioate, bis(2-hydroxyethyl)isophthalate, bis[2-(2-hydroxyethoxy)ethyl]terephthalate, bis[2-(2-hydroxyethoxy) ethyl]isophthalate, bis[(4-hydroxymethylcyclohexyl)methyl]terephthalate, and bis[(4-hydroxymethylcyclohexyl) methyl]isophthalate, mono(2-hydroxyethyl)terephthalate, or bis(2-hydroxyethyl)sulfoisophthalate, and their oligomers. Mixtures of monomers and oligomers may also be used.

By a polymerizable oligomer is meant any oligomer material which by itself or in the presence of other monomers can polymerize to a polyester. For example, reaction of dimethyl terephthalate or terephthalic acid with ethylene glycol, when carried out to remove methyl ester or carboxylic groups, usually yields a mixture of bis(2-hydroxyethyl) terephthalate, low molecular weight polymers (oligomers) of bis(2-hydroxyethyl) terephthalate and oligomers of mono(2-hydroxyethyl) terephthalate (which contain carboxyl groups). These materials are referred to herein as "polymerizable oligomer(s)". This oligomer may contain lower molecular weight polyester capable of being further extended, and varying amounts of the polymerizable monomer. Generally speaking, the less polymerizable monomer the oligomer contains, the higher the average molecular weight of the oligomer will be. Preferably, the oligomer will have an average degree of polymerization (average number of monomer units) of about 20 or less, more preferably about 10 or less. However, this process may also be used to further polymerize an already higher molecular weight polymer. Any of the monomers or oligomers used in the polymerization process should preferably be relatively nonvolatile at the process temperature, preferably less than 2 percent, and more preferably less than 1 percent, of the total monomer and/or oligomer being volatilized (codistilled with the non-solvent) during the process.

Polyesters produced by the process include, but are not limited to, poly(ethylene terephthalate), poly(1,4-butylene terephthalate), poly(ethylene 2,6-naphthalenedioate), poly-(ethylene isophthalate), poly (3-oxa-1,5-pentadiyl terephthalate), poly(3-oxa-1,5-pentadiyl isophthalate), poly[1,4-bis(oxymethyl)cyclohexyl terephthalate], and poly[1,4-bis (oxymethyl) cyclohexyl isophthalate]. Poly(ethylene terephthalate) and poly(1,4-butylene terephthalate) are preferred, and poly(ethylene terephthalate) is an especially preferred product. Therefore, preferred monomers and oligomers are those monomers and oligomers that will produce the above mentioned polymers. In the polymerization process it is preferred to use only one monomer or oligomer so as to produce a "homopolyester". If more than one monomer or oligomer is used, a "copolyester" may be produced. Small amounts of polyfunctional alcohols or acids may also be incorporated with advantage.

Preferred examples of dicarboxylic acids useful in this process include terephthalic acid, 2,6-napthalene dicarboxylic acid, 4,4'-bibenzoic acid, isophthalic acid and sulfoisophthalic acid, more preferably terephthalic acid.

Preferred examples of difunctional diols useful in this process include ethylene glycol, 1,4-butane diol, propylene glycol, cyclohexane dimethanol and diethylene glycol.

Examples of polyfunctional materials (used in small quantities for branching) useful in this process include trimethylol propane and trimellitic acid and its esters.

Solvents for this invention are materials which will dissolve at least 5 weight percent of the polymer at process temperature, preferably 10 weight percent or more. It is preferred if the starting concentration of the monomers, oligomers, or low molecular weight polyesters is at least about 5 weight percent or more of the combined starting process ingredients, more preferably 10–40 weight percent, especially preferably about 20 weight percent. Solvents useful in this invention include, but are not limited to, aromatic ethers such as phenyl ether and benzyl ether, aromatic ketones such as propiophenone and aromatic hydrocarbons such as biphenyl, preferably an aromatic ether.

Non-solvents useful in this invention include, but are not limited to, pure alkanes such as n-tetradecane or n-hexadecane, siloxanes and partially or fully halogenated alkanes or cycloalkanes. These non-solvents do not swell or dissolve the monomer or oligomer or polyester that is produced. By "does not swell" is meant that at the process temperatures, the monomer, oligomer or polymer imbibes less than 20 weight percent of the non-solvent, preferably less than 10 weight percent of the nonsolvent. By "does not dissolve" in the non-solvent is meant that, at the process temperature, the non-solvent dissolves less than 3 percent by weight of the monomer, oligomer or polymer, preferably less than 1 percent by weight.

Preferably the solvent (s) and/or non-solvent(s) form azeotropes with the polymerization by-product(s), usually diols, liberated during the condensation process. The boiling point of the lowest boiler (which is approximately the process temperature) of the solvent/non-solvent in the mixture should be high enough as to maintain the monomer, oligomer or growing polymer in the liquid state in the solvent phase, in other words, usually at least or slightly below the melting point of the polymer but not so high as to produce degradation of the polymer. By boiling point is meant the temperature at which the vapor pressure of the non-solvent, plus vapor pressure of the solvent, plus the vapor pressure of the low molecular weight product (if present) is equal to the pressure under which the process is being conducted. For instance, if being done at atmospheric pressure, it would be the atmospheric boiling point. However, the process can be conducted at pressures greater than or less than atmospheric pressure, so that the boiling point would be the boiling point under that pressure. Although not critical, it is preferred to carry out the process at a pressure of about 10 kPa to about 1 MPa, more preferably about 100 kPa (atmospheric pressure). Boiling points can be changed by operating either under pressure or vacuum. For instance to allow use of lower boiling solvents, such as anisole, or lower boiling non-solvents such as decane, higher pressures would be used. Selection of the solvent and non-solvent will also be dependent on the chemical composition of the polymer to be produced and its solubility in the solvent and non-solvent phases.

The non-solvent may be any material which is liquid at the process temperature, and preferably liquid at ambient temperature, which meets the above criteria, and does not otherwise react itself, or interfere with the polymerization, during the process. Useful non-solvents include, but are not limited to, alkanes, siloxanes, and partially and fully fluorinated hydrocarbons. Preferred non-solvents are aliphatic alkanes having the desired boiling point. They may be pure alkanes such a n-tridecane and n-tetradecane, or may be mixtures of alkanes, such as petroleum distillate fractions having the proper boiling point. In the latter case, small amounts of other compounds, preferably less than 10 mole percent, such as cycloalkanes may also be present as long as the above criteria are still met.

In a condensation polymerization, a low molecular weight (by)product is produced. For instance, in the polymerization of bis(2-hydroxyethyl) terephthalate, the low molecular weight product is ethylene glycol. It is preferred if the temperature at which the process is carried out is above the boiling point of the low molecular weight product at the pressure at which the process is performed, more preferred if the process temperature is at least about 25° C. above the boiling point of the low molecular weight product. In another preferred mode, the low molecular weight compound forms a lower boiling azeotrope with the non-solvent and/or solvent.

The ratio of the solvent to non-solvent is important in the process. At too high a ratio (i.e., too much solvent), the polymerization will occur in a single phase, as all of the process ingredients form a single liquid phase. If the ratio is too low, there will be insufficient solvent to keep the viscosity of the polymer/solvent phase low enough to prevent the dispersed droplets from prematurely agglomerating. The optimum ratio of solvent to non-solvent will vary according to the polyester being produced. Such optimum can be readily determined by those skilled in the art.

For instance, FIG. 1 illustrates the effect on intrinsic viscosity measured against weight percent of tetradecane in the solvent/non-solvent mixture. Experimental data, similar to those in Example 1, was used to formulate this graph. The results evidenced by FIG. 1 indicate the optimum ratio is about 30 weight percent tetradecane. In this series of polymerizations the process was run for a fixed period (3 hrs.) or until the polymer agglomerated, and the intrinsic viscosity of the polymer was measured. Such experimentation will lead one skilled in the art to the operative and optimum variables.

The intrinsic viscosity (IV) of the product is a measure of the polyester molecular weight. The intrinsic viscosity is measured using a Canon Fenske viscometer using 0.1 grams of polymer in 25 ml of a 1:1, by weight, solvent mixture of trifluoroacetic acid and methylene chloride. The intrinsic viscosity is then calculated from the measured relative viscosity (RV) using the equation:

$$IV=0.625\times[(RV-1)+(6.909\times\log RV)]$$

Preferred intrinsic viscosity of the product is about 0.7 or more, more preferably about 1.0 or more, and most preferably about 1.5 or more.

The volume of the distillate obtained in the process is also a consideration. Excessive amounts can lead to overly high concentrations of the polymer in the reaction mass leading to premature agglomeration. Also, any disparity in the boiling points of the solvent and non-solvent, at high distillate volumes, could lead to a shift in the solvent/non-solvent ratio in the reactor away from the defined optimum. Solvent and/or non-solvent can be added during the process to make up for material that has been distilled off. The volume of distillate necessary in any solvent/non-solvent system for any particular polyester can again be readily determined those skilled in the art.

The polymerization is carried out at 150° C. or higher, preferably 200° C. or higher, commensurate with the need to keep the polymer/solvent phase liquid and to provide a convenient polymerization rate. The process ingredients and product should be reasonably stable at the temperature at which the process is conducted. It may be advantageous to conduct the process under a blanket of inert gas such as nitrogen to avoid oxidation of sensitive ingredients or products.

Since no surfactant is present, it is necessary to agitate the reaction mixture to ensure some dispersion of the monomer, oligomer or polymer/solvent droplets. While the exact size of the particles is not critical, a smaller size is preferred since the smaller the size, the larger the surface area for removal of the polycondensation by-product and the faster (up to a point) the polymerization will proceed. For any given set of conditions (solvent, non-solvent, process temperature, polymer being made, ratio of solvent to non-solvent, concentration of monomer in the mixture, stirrer and vessel, etc.) it is believed that for a given agitation (or shear rate), the polymer will coalesce (eventually) to a viscous mass at a given (average) molecular weight. Thus, at any given set of conditions, including the shear rate due to agitation, the molecular weight of the polymer is believed to be in essence "self-limiting". In this type of process, the greater the agitation of the process mixture, the higher the resulting polymer (average) molecular weight will be. These self limiting values are easily obtained by simple experimentation for any given set of process conditions. A number of runs can be made at different shear levels or with other variables to determine when agglomeration occurs.

While the starting concentration of monomer and/or oligomer in the system may be as low as desired, it will normally be desirable to keep this concentration as high as possible, commensurate with minimizing agglomeration and obtaining the desired product properties, to obtain maximum productivity from the equipment used. This maximum concentration will usually be dependent on the particular system to be polymerized taking into account the degree of shear, the solubility of the polymer in the solvent chosen, the temperature of the polymerization and the desired degree of polymerization. The ultimate use of the reaction mixture, whether it is to be spun into fibers or cast into a film etc., as noted below, is also a consideration for determining the starting concentrations of monomer and/or oligomer as this, along with the factors noted above, will affect the percent solids and viscosity of the final solution.

Other conventional polymerization ingredients may also be present in the process, for example, a polymerization catalyst and/or an antioxidant. Catalysts used for this invention include, but are not limited to, titanates, germanium dioxide and antimony oxide and its glycollates.

This invention is applicable to various operations known in the art, including but not limited to, continuous or batch operation. In one preferred embodiment the reaction is run in a batch mode which involves multiple reactors which are sequentially in a charging, polymerizing or discharging phase. The reaction product may be collected into a vessel capable of decanting the lower polymer/solvent phase which can then be converted to shaped articles such as fibers or films. The residual solvent may be removed by aspiration, water or solvent extraction or other means known to the art. The extracted solvent can then be purified and returned to the reactor. The upper layer in the decanter, usually predominantly the non-solvent, may also be purified and, again, recycled back to the reactor.

A solution of product polyester in the solvent may also be used directly to form products. This solution may be used to form cast films, see for instance H. Mark et al., Ed., Encyclopedia of Polymer Science and Engineering, Vol. 7, John Wiley & Sons, New York, 1987, pp. 88–106. If in the proper viscosity range, the solution may also be used to dry spin or wet spin fibers, see for instance H. Mark et al., Ed., Encyclopedia of Polymer Science and Engineering, Vol. 6, John Wiley & Sons, New York, 1986, pp. 802–839.

EXAMPLE 1

Dimethyl terephthalate (DMT) (626.0 g) and ethylene glycol (400 g) were mixed together along with titanium isopropyl titanate (0.08 mL) in a 2 liter flask equipped with a stirrer, a thermometer and a 13 inch Vigreaux condenser leading to a distillation head with a graduated receiver. The vessel was blanketed with nitrogen and heated to react the components and distill off the methanol reaction by-product. After 5.5 hours, 255 mL of methanol had been liberated, i.e., close to the stoichiometric quantity expected. This bis(2-hydroxyethyl) terephthalate monomer was then cast into aluminium pans and allowed to cool. Analysis of this material showed 0.37% unreacted DMT. 50 g of this monomer was then added to a 500 mL flask equipped as above along with 149.8 g of phenyl ether plus 64.2 g of tetradecane. The mixture was then heated, at the boil (~250° C.) under a nitrogen blanket for 3 hours at atmospheric pressure to codistill the ethylene glycol polycondensation polymerization by-product along with some of the solvent/non-solvent mixture. The reaction mixture was hazy during this period indicating a discontinuous phase. At the end of the reaction, 10.5 mL of ethylene glycol had been collected in the receiver along with 110.2 mL of the solvent/non-solvent mixture. The agitation was then stopped and the molten discontinuous phase settled to the base of the vessel. The upper layer, believed to be predominantly the tetradecane non-solvent, was then be decanted off. The polymer/solvent phase analyzed as ~65% solids. Fibers could be drawn from this viscous solution. This solution was then allowed to cool and the resulting solid extracted with acetone to remove the phenyl ether. The resulting polymer had an intrinsic viscosity of 2.24 dL/g and a melting point of 250.3° C. Note: the tetradecane used in these examples is highly flammable. Auto Ignition temperature ~200° C. Great care should be used when working with this material.

Comparative Example 1A

In a comparative example, 50 g of the same bis(2-hydroxyethyl) terephthalate used in Example 1, was polymerized in a phenyl ether solvent (214.0 g) without any of the tetradecane non-solvent. The reaction was a clear, single phase, solution throughout the three hour reaction time. At the end of the reaction, 11.0 mL of ethylene glycol had been collected in the receiver along with 75.0 mL of phenyl ether. The resulting 24.4% solids solution was allowed to cool and was extracted with acetone. The resulting polymer had an intrinsic viscosity measured as above of 1.14 dL/g vs 2.24 for polymer in Example 1.

Comparative Example 1B

In a further comparative example, 50 g of the same bis(2-hydroxyethyl) terephthalate monomer used in Example 1 was polymerized in tetradecane non-solvent, (214.0 g) without any of the phenyl ether solvent. The reaction mixture was hazy indicating a discontinuous phase.

After one hour and twenty minutes, the droplets in the polymer phase coagulated and formed a viscous mass around the agitator, eventually causing the stirrer to stop. The tetradecane was decanted from this mass, and the mass was then allowed to cool and extracted with acetone. The intrinsic viscosity of this polymer was 0.73 dL/g vs 2.24 for polymer made in accordance with this invention and 1.14 for polymer made by a solution polymerization.

Example 2

Oligomer (50.0 g), produced in a commercial manufacturing plant by reaction of terephthalic acid with ethylene glycol, was added to a 500 mL flask equipped as per Example 1 along with 3.0 g additional ethylene glycol, plus 0.01 mL titanium isopropyl titanate catalyst, phenyl ether solvent (149.8 g) and tetradecane non-solvent (64.2 g). The additional glycol was required to react with the predominantly carboxylic acid end of the oligomer to enhance reactivity. The mixture was heated to 220° C. for 15 minutes to bring about this initial reaction, then further heated at the boil to remove the added ethylene glycol and glycol condensation polymerization by-product. The polymerizing mixture was hazy throughout the reaction indicating a two phase system. After three hours, 3.8 mL of ethylene glycol had been collected in the receiver along with 110.4 mL of the codistilled solvent/non-solvent. Agitation was then stopped and the polymer/solvent phase allowed to settle out. This was decanted from the continuous, predominantly tetradecane, phase again leaving a viscous mass from which fibers could be pulled. This mass was allowed to cool and was weighed before and after extraction with acetone. These weighings indicated that the viscous mass was ~51% solids. The extracted polymer was found to have an intrinsic viscosity of 2.52 dL/g.

Comparative Example 2A

A comparative example using the same oligomer as Example 2 was run under the same conditions as Example 2, except that only phenyl ether (214.0 g) was used, and no tetradecane was used. The reaction was a clear solution throughout the polymerization indicating a single phase condition. The resulting polymer, after extraction with acetone, had an intrinsic viscosity of 1.20 dL/g vs 2.52 in Example 2.

Comparative Example 2B 50 g of the oligomer used in Example 2 was polymerized in a tetradecane non-solvent (214.0 g) without any of the phenyl ether solvent present. The reaction mixture was hazy indicating a discontinuous phase. After 2 hours and 45 minutes, the polymer droplets agglomerated and formed a viscous mass around the agitator eventually causing the stirrer to stop. The tetradecane was decanted from this mass which was then allowed to cool and was extracted with acetone. The intrinsic viscosity of this polymer was 0.95 dL/g vs 2.52 for polymer made in Example 2.

Example 3

Dimethyl terephthalate (DMT) (607.0 g), dimethyl sodiosulfoisophthalate (19.0 g) and ethylene glycol (400 g) were mixed together along with titanium isopropyl titanate (0.08 mL) in a 2 liter flask equipped with a stirrer, a thermometer and a 13 inch Vigreaux condenser leading to a distillation head with a graduated receiver. The vessel was blanketed with nitrogen and heated to react the components and distill off the methanol reaction by-product. After 3.5 hours, 260 mL of methanol had been liberated, i.e., close to the stoichiometric quantity expected. This bis(2-hydroxyethyl) terephthalate/sodiosulphoisophthalate monomer was then cast into aluminium pans and allowed to cool. Analysis of this material showed 1.71% unreacted DMT. 50 g of this monomer was then added to a 500 mL flask equipped as above, along with 139.0 g of phenyl ether and 35.0 g of tetradecane. The mixture was then heated, at the boil (~250° C.) under a nitrogen blanket for 5 hours at atmospheric pressure to codistill the ethylene glycol polycondensation polymerization by-product along with some of the solvent/non-solvent media. The reaction mixture was hazy during this period indicating a discontinuous phase. At the end of the reaction, 10.3 mL of ethylene glycol had been collected in the receiver along with 167.7 mL of a solvent/non-solvent mixture. The agitation was then stopped and the molten discontinuous phase settled to the base of the vessel. The upper layer, believed to be predominantly the tetradecane non-solvent, was decanted off.

The polymer/solvent phase was analyzed and found to be ~43% solids. This solution was then allowed to cool and the resulting solid extracted with acetone to remove the phenyl ether. The resulting polymer had an intrinsic viscosity of 1.45 dL/g. A comparative experiment using just the phenyl ether solvent gave a polymer with an intrinsic viscosity of 0.47 dL/g.

Example 4

The procedure of Example 3 was repeated using dimethyl 2,6-naphthalene dicarboxylate in place of the dimethyl terephthalate and the sodiosulfo isophthalate. The polymer produced had an intrinsic viscosity of 1.33 dL/g vs 0.54 for a comparable polyethylene naphthanate polymer made by a solution polymerization in phenyl ether.

Example 5

The procedure of Example 3 was repeated using a mixture of dimethyl terephthalate and bis(2-hydroxyethyl) 4,4'-bibenzoate (HEB), supplied by Monsanto, in place of the dimethyl terephthalate and the sodiosulfo isophthalate. The DMT/HEB ratio used was 72/28 by weight. The polymer produced had an intrinsic viscosity of 1.74 dL/g vs 0.42 for a comparable polyethylene 4,4'-bibenzoate/terephthalate copolymer made by a solution polymerization in phenyl ether.

Example 6

Dimethyl terephthalate (38.2 g) and 1,4-butanediol (23.0 g) were heated, under a nitrogen blanket, in a 500 ml flask equipped as per the preceding examples along with 0.027 ml of tetraisopropyl titanate for 60 minutes. During this time, the temperature of the reaction rose from 153° C. to 240° C. and 12.4 ml of methanol were liberated. A sample of the bis(2-hydroxybutyl)terephthalate monomer was analyzed as having 1.19% unconverted dimethyl terephthalate. Phenyl ether (107.0 g) and tetradecane (107.0 g) were then added and the mixture heated at the boil for an additional 3 hours to codistill out the excess 1,4-butanediol along with the solvent/heating media. After the three hour polymerization time, 4.9 ml of the butane diol polycondensation polymerization by-product plus 112.1 ml of the solvent/heating media was distilled over. During this polymerization time, the mixture was hazy indicating a 2 phase system. When agitation was stopped at the end of the reaction, the discontinuous phase settled to the base of the reactor. The layer was sampled and found to be 48.6% solids. The polymer was isolated from this sample by extraction with acetone. This PBT polymer had an intrinsic viscosity of 1.18.

Example 7

Polyethylene terephthalate (30.0 g), with an intrinsic viscosity of 0.79 dL/g was dissolved in phenyl ether (301.0 g) heated to approximately 200° C. Tetradecane (127.7 g) that had been passed down a column of acidic alumina and sparged with nitrogen was then added by means of a syringe causing precipitation. Continued heating and stirring caused the precipitate to re-disperse in the media. Then 6.0 mL of a 1:1000 solution of tetrapropyl titanate in tetradecane was added by means of a syringe. The resulting mixture was heated at about 248° C. under nitrogen at 500 rpm for 4 hours during which time 250 mL of distillate was collected. The stirring was stopped and the reaction mixture was allowed to cool to room temperature. The resulting polymer was isolated and extracted with acetone to remove residual solvent/non-solvent. The polymer had an intrinsic viscosity of 2.40 dL/g.

What is claimed is:

1. A process for polymerization to a polyester product selected from the group consisting of poly(ethylene terephthalate) and poly(1,4-butylene terephthalate), which process comprises heating and agitating a mixture comprising a solvent, non-solvent, and one or more members of the group consisting of polymerizable monomers, oligomers, or lower molecular weight polyesters which produces such a polyester product at a temperature of about 200° C. or higher, while co-distilling from the mixture a polymerization by-product and the solvent, non-solvent, or solvent and non-solvent;

provided that the polyester product and the solvent form a first liquid phase separate from a second liquid phase formed predominantly by the non-solvent at said temperature, said agitating being sufficient to disperse said first liquid phase as a non-continuous or discrete phase in the form of droplets in said second liquid phase, and wherein the ratio of the solvent to non-solvent, while allowing the formation of more than one single liquid phase, results in the first liquid phase having a viscosity that is sufficiently low to prevent the droplets from prematurely agglomerating.

2. The process in accordance with claim 1 wherein said polyester is poly(ethylene terephthalate).

3. The process in accordance with claim 1 wherein the monomer and oligomer are produced from terephthalic acid or its alkyl ester and ethylene glycol.

4. The process as recited in claim 3 wherein said monomer, monomers, oligomer or oligomers are selected from the group consisting of bis(2-hydroxyethyl) terephthalate, bis(4-hydroxybutyl) terephthalate, bis(2-hydroxyethyl) naphthalenedioate, bis(2-hydroxyethyl) isophthalate, bis[2-(2-hydroxyethoxy) ethyl] terephthalate, bis[2-(2-hydroxyethoxy)ethyl]isophthalate, bis[(4-hydroxymethylcyclohexyl)methyl]terephthalate, bis[(4-hydroxymethylcyclohexyl)methyl]isophthalate, mono(2-hydroxyethyl)terephthalate, and bis(2-hydroxyethyl)sodiosulfoisophthalate.

5. The process as recited in claim 4 wherein one monomer or one oligomer is used to produce a homopolymer.

6. The process as recited in claim 5 wherein said monomer is bis(2-hydroxyethyl) terephthalate or bis(4-hydroxybutyl) terephthalate, and said oligomer is an oligomer of bis(2-hydroxyethyl) terephthalate or bis(4-hydroxybutyl) terephthalate.

7. The process in accordance with claim 1 wherein the lower molecular weight polyester is polyethylene terephthalate.

8. The process in accordance with claim 1 wherein a fiber of said polyester product is formed from a solution of said polyester product in said solvent.

* * * * *